United States Patent
DeFigueiredo et al.

(10) Patent No.: US 9,511,944 B2
(45) Date of Patent: Dec. 6, 2016

(54) VIBRATING TRAY FOR DIVERTED CARD INSERTS

(71) Applicant: Pitney Bowes Inc., Danbury, CT (US)

(72) Inventors: Carlos L. DeFigueiredo, Sandy Hook, CT (US); John R. Masotta, Newtown, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 14/561,653

(22) Filed: Dec. 5, 2014

(65) Prior Publication Data

US 2016/0159576 A1   Jun. 9, 2016

(51) Int. Cl.
| | |
|---|---|
| *B65H 39/10* | (2006.01) |
| *B65G 27/04* | (2006.01) |
| *B65H 29/52* | (2006.01) |
| *B65H 29/62* | (2006.01) |
| *B65H 39/06* | (2006.01) |
| *B07C 5/36* | (2006.01) |
| *B65G 27/08* | (2006.01) |
| *B65G 27/18* | (2006.01) |

(52) U.S. Cl.
CPC ............. *B65G 27/04* (2013.01); *B07C 5/36* (2013.01); *B65G 27/08* (2013.01); *B65G 27/18* (2013.01); *B65H 29/52* (2013.01); *B65H 29/62* (2013.01); *B65H 39/06* (2013.01); *B65H 2301/441* (2013.01); *B65H 2301/4462* (2013.01); *B65H 2404/6922* (2013.01); *B65H 2404/731* (2013.01); *B65H 2701/1914* (2013.01)

(58) Field of Classification Search
CPC ... B65G 47/1492; B65G 27/32; B65G 11/023; B65G 27/00; B65H 5/021; B65H 7/06; B65H 29/54; B65H 29/58; B65H 29/585; B65H 29/60; B65H 29/62; B29C 66/90; B29C 66/472

USPC ... 193/2 R, 3, 752.1, 758; 156/277, 64, 363, 156/364, 378, 379; 271/3.15, 4.02, 4.06, 279, 271/280, 287, 288, 296, 298, 299, 300, 302, 271/307, 176; 198/752.1, 758

See application file for complete search history.

(56) References Cited

U.S. PATENT DOCUMENTS

| 2,570,288 A * | 10/1951 | Todd ........................... 209/587 |
| 2004/0089706 A1* | 5/2004 | Hill |
| 2009/0152177 A1* | 6/2009 | Greenspan et al. .......... 209/580 |

FOREIGN PATENT DOCUMENTS

| GB | 866154 | * | 4/1961 |
| GB | 2102758 | * | 2/1983 |

* cited by examiner

*Primary Examiner* — Thomas Morrison
(74) *Attorney, Agent, or Firm* — Michael J. Cummings; Charles R. Malandra, Jr.; Steven J. Shapiro

(57) ABSTRACT

An automated apparatus and method for collecting and dispensing rejected cards in a tray in a card attaching system. Sheets are transported on a moving belt. Cards are fed from a feeder above the moving belt. Cards are deposited onto the sheets. When a card rejection condition is detected, a rejected card is diverted and deposited in a tray having a sloped chute. The sloped chute extends down to a lower position beyond an outside edge of the moving belt. To facilitate movement down the chute, the tray is vibrated. This vibration is accomplished by supporting the tray on a roller assembly that rolls on a surface of the moving belt as it passes under the sloped chute. The roller is non-circular or of an eccentric configuration, such that the axis of the roller will experience a vertical displacement as the roller rotates, jogging the tray.

15 Claims, 5 Drawing Sheets

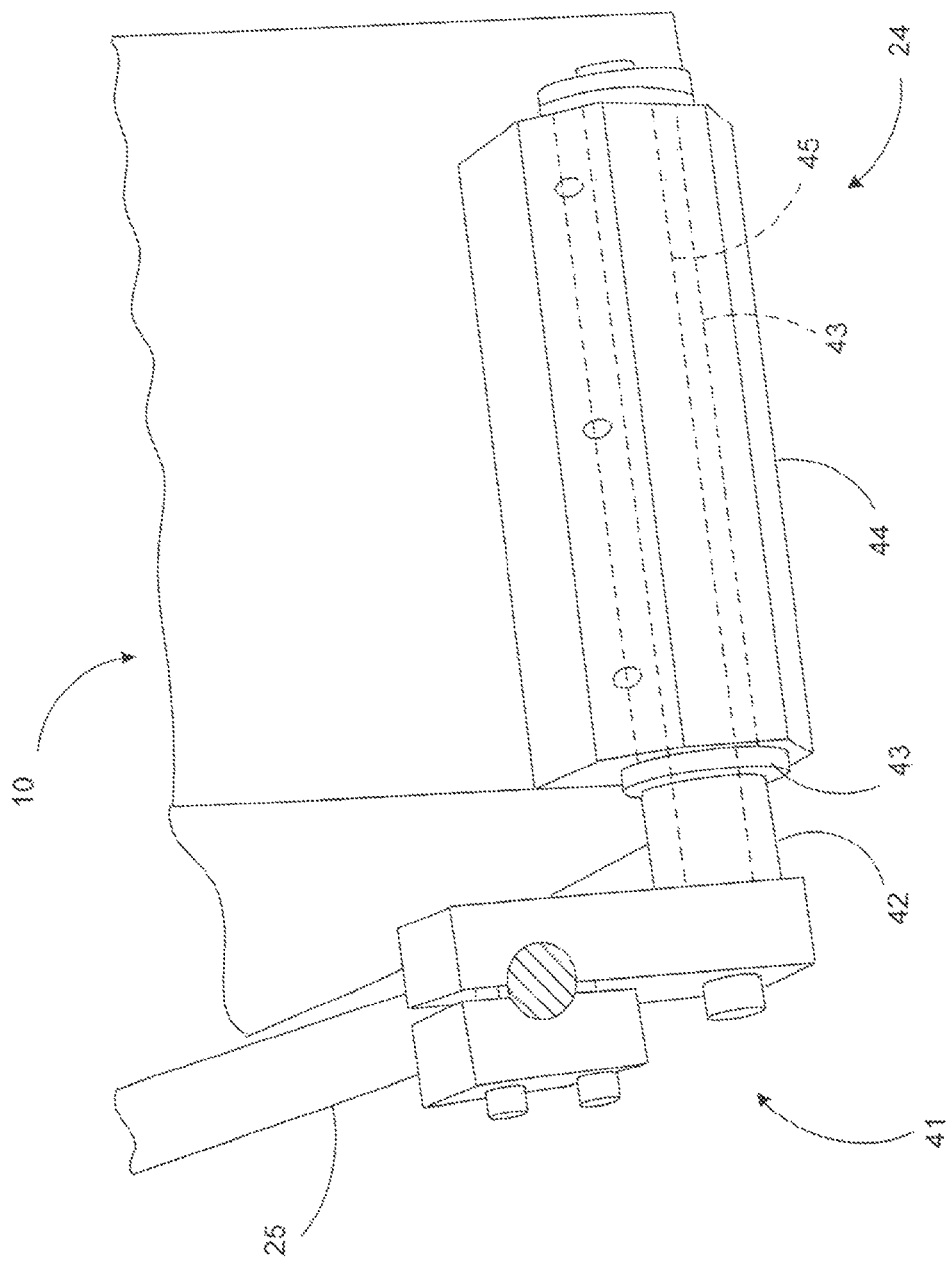

VIBRATING TRAY FOR DIVERTED CARD INSERTS

TECHNICAL FIELD

The present invention relates to error handling in an automated system for attachment of plastic cards to mail items in a mail production machine.

BACKGROUND OF THE INVENTION

A mail insertion system or a "mailpiece inserter" is commonly employed for producing mailpieces intended for mass mail communications. Such mailpiece inserters are typically used by organizations such as banks, insurance companies and utility companies for producing a large volume of specific mail communications where the contents of each mailpiece are directed to a particular addressee.

In many respects, a typical inserter resembles a manufacturing assembly line. Sheets and other raw materials (i.e., a web of paper stock, enclosures, and envelopes) enter the inserter system as inputs. Various modules or workstations in the inserter system work cooperatively to process the sheets until a finished mail piece is produced. The precise configuration of each inserter system depends upon the needs of each customer or installation.

Typically, inserter systems prepare mall pieces by arranging preprinted sheets of material into a collation, i.e., the content material of the mail piece, on a transport deck. The collation of preprinted sheets may continue to a chassis module where additional sheets or inserts may be added based upon predefined criteria, e.g., an insert being sent to addressees in a particular geographic region. Once filled, the envelopes are closed, sealed, weighed, and sorted. A postage meter may then be used to apply postage indicia based upon the weight and/or size of the mail piece. The mailpieces will then be moved to a stacker where mailpieces are collected and stacked, either on edge or laid flat.

In one particular implementation of an inserter system, a plastic card, such as a credit card, a membership card, or the like, is included in the mail collation. In such systems, individual cards are removed from a stack of cards to be attached to sheets of paper that are them folded and included in a mail collation. Cards are typically held in place on the sheets by an adhesive that is deposited on the sheet upstream of the card feeder location.

Before they are attached to the sheets, the cards are checked to make sure that they conform to the intended mail piece. If the card cannot be properly read, or if it is damaged, or if it appears to be out of sequence, then, rather than shutting down the inserter system, the individual card can be diverted away from normal processing and collected in a reject bin. Alternatively, a problem with some other part of the mail piece might make it necessary to divert the plastic card.

Since rejected cards must be periodically emptied from the reject bin, there is a need to provide a safe and efficient means for an operator to get access to the cards, so that the bin does not overflow. In a typical arrangement, the operator would need to open the covers of the inserter system in order to get access to the bin. Opening the covers on this type of equipment exposes the operator to moving parts that could cause an injury. Alternatively, the system can be paused while such an operation is carried out.

SUMMARY OF THE INVENTION

The proposed tray solves the problems of emptying a reject bin by substituting a tray with a sloped chute that leads out of the equipment. Cards can slide down the chute to an endpoint outside of the covers of the machine, such that the covers don't need to be opened to retrieve the diverted cards. A shaking motion is added to the tray to assist in the movement of cards down the chute. In the preferred embodiment, the shaking motion is supplied without any additional power source or any additional actuating mechanism.

More particularly, the invention is an automated apparatus and method collecting and dispensing rejected cards in a tray in a card attaching system. Sheets of paper are transported on a moving belt. Cards are fed from a card feeder positioned above the moving belt and cards are deposited onto the sheets of paper transported on the moving belt.

When a card rejection condition is detected, a defective card cannot be attached to the sheet. The rejected card is diverted and deposited in a tray having a sloped chute. The tray receives diverted cards from the card feeder at an elevated position over the moving belt. The tray includes a sloped chute extending down to a lower position beyond an outside edge of the moving belt.

To facilitate movement of the cards down the chute, the tray is vibrated. In the preferred embodiment this vibration is accomplished by supporting the tray on a roller assembly that is positioned to roll on a surface of the moving belt as it passes under the sloped chute. To impart the vibration, the roller is non-circular or of an eccentric configuration, such that the axis of the roller will experience a vertical displacement during rotation.

In preferred embodiments, the roller can includes a circular wheel with at least one flattened side on its perimeter, or a circular wheel with an off-center axis of rotation. Alternatively, the roller can comprise an oval wheel, or other non-circular shape.

In another preferred embodiment, the tray is connected to the card attaching system with a vibration isolation mounting to minimize vibration transfer to the card attaching system.

BRIEF DESCRIPTION OF THE DRAWINGS

FIG. 4 shows details of the tray mounting mechanism to the card attaching system.

DETAILED DESCRIPTION

Figure 1:
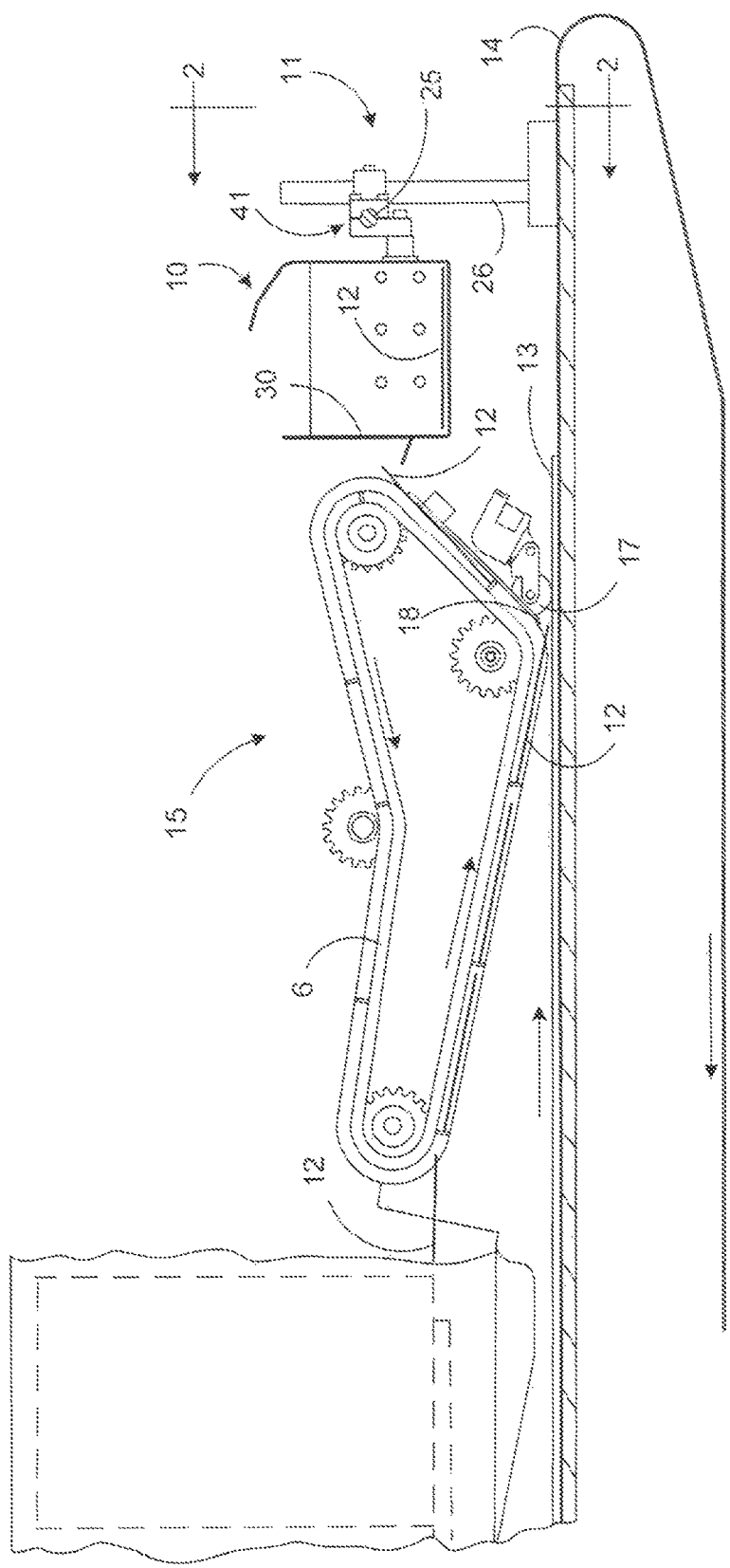
FIG. 1 shows a side view of the card attaching system with the divert tray.

FIG. 1 shows the card attaching system in which the diverter collection tray operates. A card depositing feeder 15 receives cards 12 that are individually placed on sheets 13 that are transported on a transport belt 14. The paper sheets 13 will typically have an adhesive material placed on them at the position where the cards are to be attached. A feeder belt 6 in the feeder 15 moves the cards 12 through the feeder 15 mechanism. The cards 12 are released from the feeder 15 and they can be pressed into position on the sheet 13 by a roller 17.

In some cases, it will be determined that a card 12 cannot be placed on a sheet 13, and a diverter mechanism 18 will move to change the path of a rejected card 12 away from the feeder 15 opening, in an upward direction to a diverted card collection tray 10. Typical reasons for diverting a card may be that the card is damaged, the card is unreadable, the card is not the expected card for the particular mail piece that is being prepared, or there may be a problem with the sheet 13, such that it cannot accept the card 12.

Figure 2:
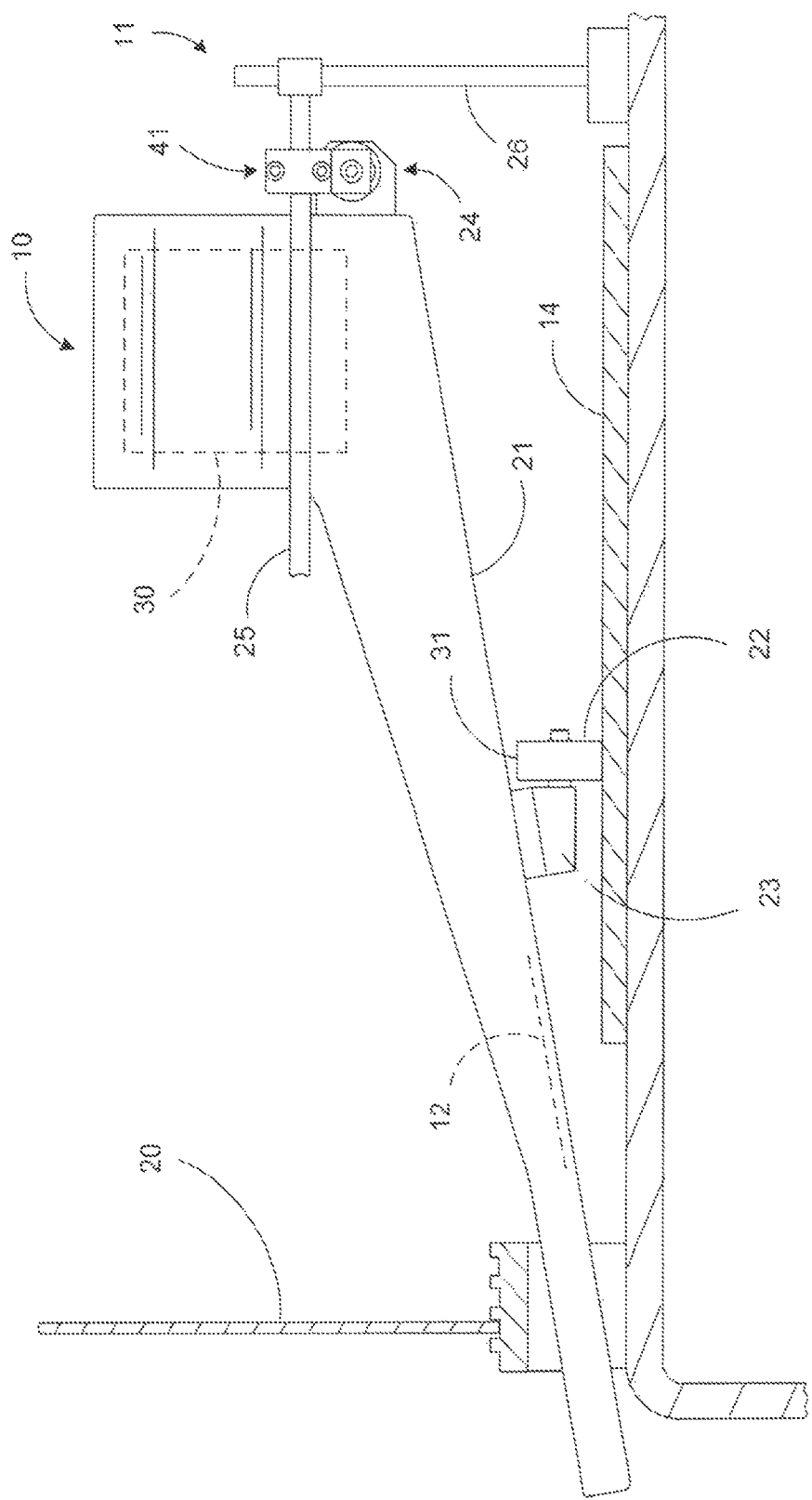
FIG. 2 shows positioning of the vibrating tray above the moving belt from an end view of the card attaching system.
Figure 3:
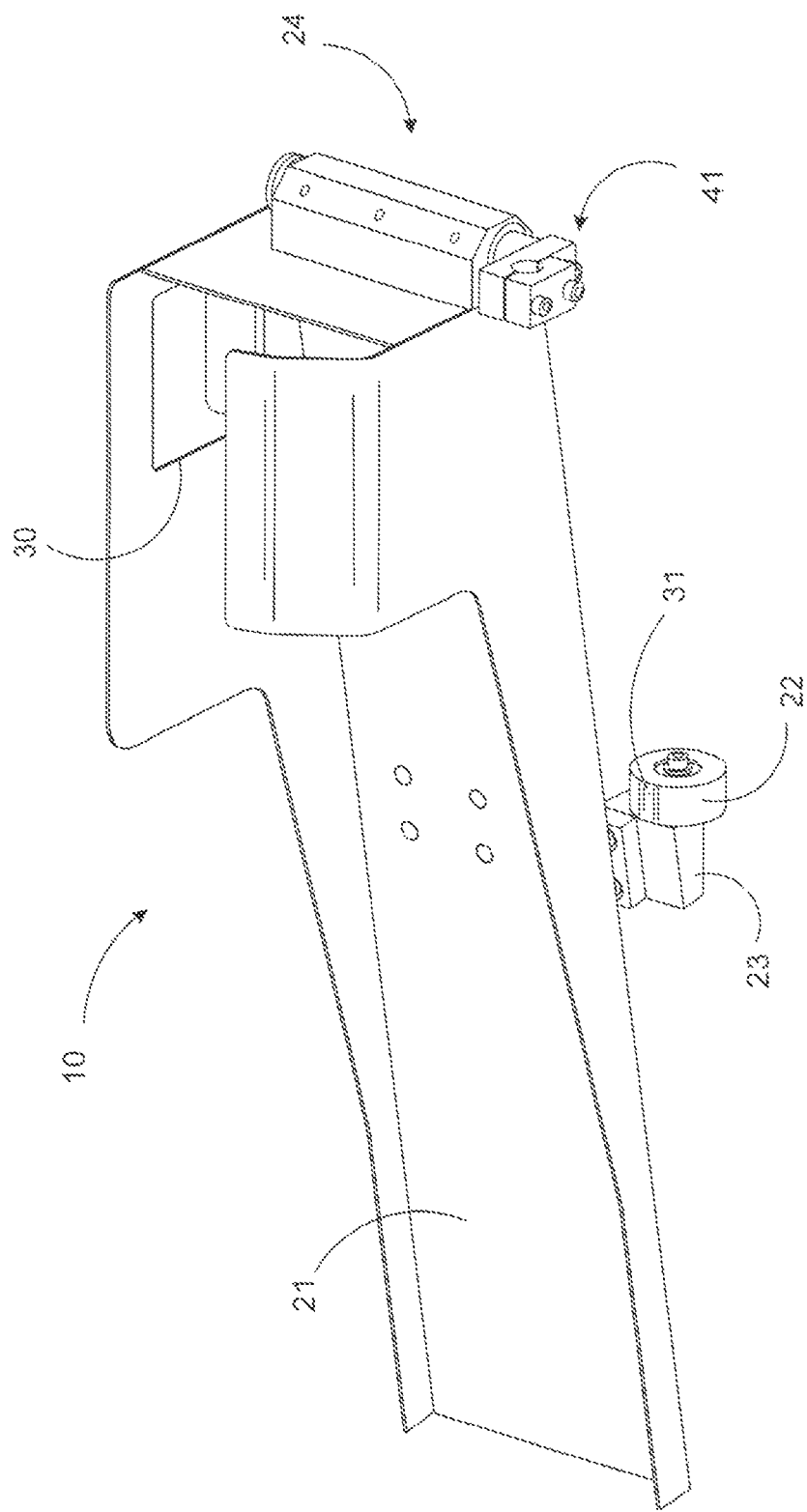
FIG. 3 is an isometric view of the tray assembly.

The diverted card 12 is ejected from the divert path of the feeder 15 into the tray 10, through tray opening 30, as seen in FIGS. 2 and 3. The tray 10 includes a downward sloped chute 21, that starts above the area of belt 14, where the sheets 13 are transported, and ends at a lower point, preferably away from the moving parts of the device and outside of the apparatus.

As seen in FIG. 2, in a preferred embodiment the chute extends through a gap in the protective cover 20 that is usually in place over the moving components. The cards 12 that slide down the chute 21 can then be collected by an operator without opening the cover 20, or the cards 12 can be allowed to drop into a receptacle outside the covers 20.

In the preferred embodiment, a jogging or vibrating motion is imparted on to the tray 10 to assist movement of cards 12 down the chute 21. To this end, the tray 10 is supported from underneath by a mounting assembly 23 and a jogging roller 22. The jogging roller 22 rests on top of the belt 14 and rolls along as the belt 14 moves. The roller 22 is configured to impart a vertical motion to the tray 10, thereby providing the desired jogging motion to the cards 12 contained therein. An advantage of using the jogging roller 22 in combination with the tray 10 is that no additional power source or actuator is needed to provide this desired motion.

Figure 5A:
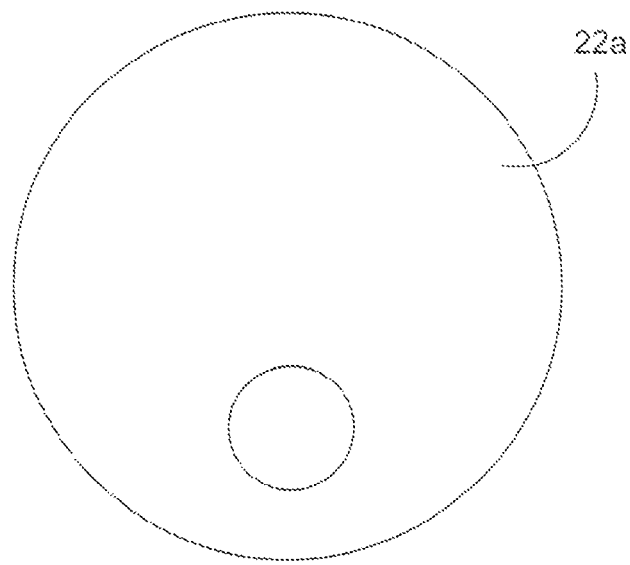
FIGS. 5A and 5B show different configurations of the axis roller for vibrating the tray.
Figure 5B:
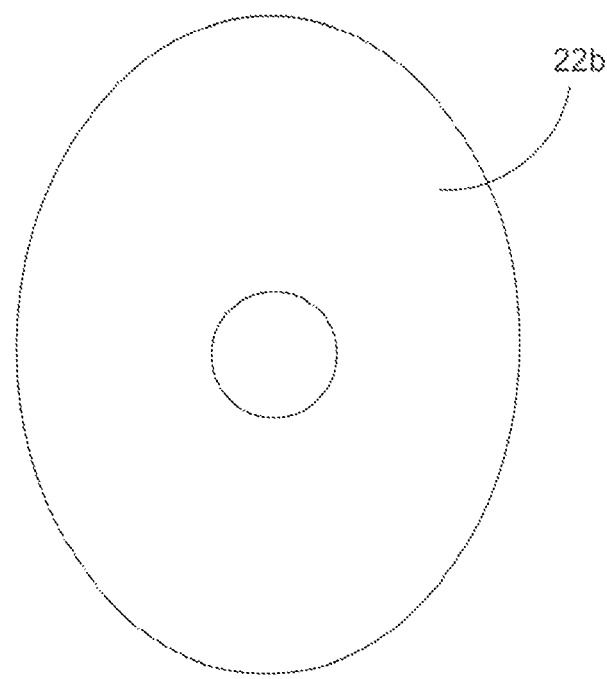

In one embodiment, the roller 22 includes one or more flattened surfaces 31. (See Roller 22a, FIG. 5A). Alternatively, the axis of the roller 22 can be positioned eccentrically (not in the center), so that an uneven vertical motion is generated. (See roller 22b, FIG. 5B). The roller 22 can also be other non-circular shapes, such as an oval.

As seen in FIGS. 2, 3, and 4, the tray 10 is also supported by vibration mounted hinge 24 that connects to the structure of the card attaching system via vertical member 25 and horizontal member 26. A movable mounting mechanism 41 supports a hinge shaft 42 around which the tray hinge mounting 44 can pivot. In the preferred embodiment, the tray mounting 44 is vibration isolated from the rest of the structure connecting to the card attaching system. Accordingly, in between the hinge shaft 42 and the tray hinge mounting 44, a vibration absorbing material 43 such as rubber, or other elastomeric material, is also used in the mounting 44.

Although the invention has been described with respect to preferred embodiments thereof, it will be understood by those skilled in the art that the foregoing and various other changes, omissions and deviations in the form and detail thereof may be made without departing from the spirit and scope of this invention.

What is claimed is:

1. A tray for collecting and dispensing diverted cards in a card attaching system, wherein the card attaching system includes a card feeder positioned above a moving belt for depositing cards onto sheets of paper transported on the moving belt, and wherein the card feeder includes a divert mechanism for diverting rejected cards onto an alternate card path so that the rejected cards are not deposited, and are collected in the tray, the tray comprising:
    a sloped chute positioned to receive diverted cards from the card feeder at an elevated position over the moving belt and extending down to a lower position beyond an outside edge of the moving belt;
    a chute support extending from the chute to a surface of the moving belt; the chute support resting on a roller that is positioned to roll on a surface of the moving belt as it passes under the sloped chute; and
    wherein the roller has a configuration selected from one or more of a non-circular or an eccentric configuration, such that the roller will experience a vertical displacement as the roller rotates, imparting a vertical jogging motion on the chute support and the sloped chute.

2. The tray of claim 1 wherein the roller configuration includes a circular wheel with at least one flattened side on its perimeter.

3. The tray of claim 1 wherein the roller configuration includes a circular wheel with an off-center axis of rotation.

4. The tray of claim 1 wherein the roller configuration includes an oval wheel.

5. The tray of claim 1 further including a support bracket for supporting the tray on the card attaching system, and wherein the support bracket uses a vibration isolation mounting to connect to the card attaching system.

6. A card attaching system with a tray for collecting and dispensing diverted cards, including:
    a moving belt that transports sheets of paper on which cards will be deposited;
    a card feeder positioned above the moving belt and depositing cards onto sheets of paper transported on the moving belt, the card feeder including a divert mechanism for diverting rejected cards onto an alternate card path to a tray, so that the rejected cards are not deposited;
    wherein the tray comprises:
        a sloped chute positioned to receive diverted cards from the card feeder at an elevated position over the moving belt and extending down to a lower position beyond an outside edge of the moving belt;
        a chute support extending from the chute to a surface of the moving belt; the chute support resting on a roller that is positioned to roll on a surface of the moving belt as it passes under the sloped chute; and
        wherein the roller has a configuration selected from one or more of a non-circular or an eccentric configuration, such that the roller will experience a vertical displacement as the roller rotates, imparting a vertical jogging motion on the chute support and the sloped chute.

7. The card attaching system of claim 6 wherein the roller configuration includes a circular wheel with at least one flattened side on its perimeter.

8. The card attaching system of claim 6 wherein the roller configuration includes a circular wheel with an off-center axis of rotation.

9. The card attaching system of claim 6 wherein the roller configuration includes an oval wheel.

10. The card attaching system of claim 6 further including a support bracket for supporting the tray on the card attaching system, and wherein the support bracket uses a vibration isolation mounting to connect to the card attaching system.

11. A method of collecting and dispensing rejected cards in a tray in a card attaching system wherein the tray comprises a sloped chute, the method including:
    transporting sheets of paper on a moving belt;
    feeding cards from a card feeder positioned above the moving belt and depositing cards onto the sheets of paper transported on the moving belt;

receiving rejected cards from the card feeder in the tray at an elevated position over the moving belt and extending down to a lower position beyond an outside edge of the moving belt;

vibrating the tray by supporting the tray on a chute support resting on a roller that is positioned to roll on a surface of the moving belt as it passes under the sloped chute and wherein the roller has a configuration selected from one or more of a non-circular or an eccentric configuration, such that the roller will experience a vertical displacement as the roller rotates, imparting a vertical jogging motion on the chute support and the sloped chute.

12. The method of claim 11 wherein the roller configuration includes a circular wheel with at least one flattened side on its perimeter.

13. The method of claim 11 wherein the roller configuration includes a circular wheel with an off-center axis of rotation.

14. The method of claim 11 wherein the roller configuration includes an oval wheel.

15. The method of claim 11 further including step of supporting the tray on the card attaching system with a vibration isolation mounting to connect to the card attaching system.

* * * * *